Patented Feb. 17, 1942

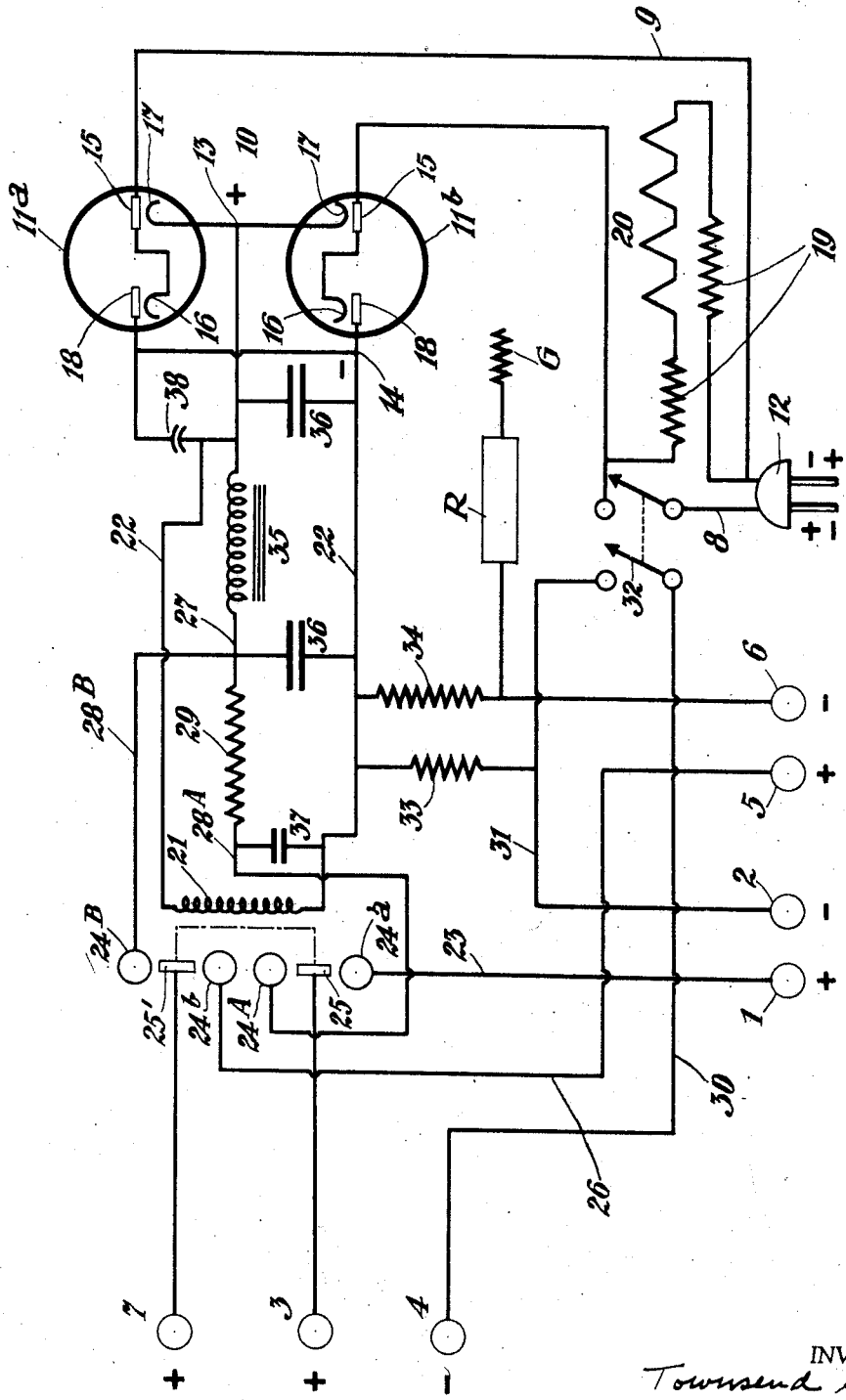

2,273,709

UNITED STATES PATENT OFFICE 2,273,709

ELECTRIC POWER TRANSMISSION CIRCUIT

Townsend S. Jones, Great Neck, N. Y., assignor to Hazeltine Corporation, a corporation of Delaware Application February 2, 1939, Serial No. 254,290

11 Claims. (Cl. 250—27)

This invention relates to a transmission circuit.

One mode of utilizing the circuit is in connection with a portable radio set whereby said set may be operated from batteries, or from direct or alternating house supply current, without regard to the polarity of the house current connection plug; and whereby said source of supply will be automatically shifted from battery to house current, and from house current to battery, upon insertion or withdrawal of a house current connection plug, without the manual operation of any switch other than the usual switch for turning a radio set on or off.

An object of the invention is to provide apparatus of this kind adapted to enable a radio receiver to be operated either as a portable set from batteries enclosed with it in a unitary casing, or independently of the batteries through connection with the regular electric circuit of a house irrespective of whether it supplies alternating or direct current. The parts of the apparatus are so constructed and related that, when the apparatus is connected to a house circuit the batteries cease to be operative as soon as the house circuit becomes operative, and become operative again immediately to continue reception when the house circuit is disconnected.

Another object is to provide means by which either an alternating or direct current supply circuit can be utilized to transmit current to the receiver, such that no precautions are demanded when direct current is utilized, and no additional appliance, such as a polarized connector, is required to avoid joining the high potential side of the supply circuit to the wrong side of the receiver, but on the contrary, an ordinary connector plug suffices to ensure the correct operative connection of the apparatus to the receiver regardless of which of the terminals of the plug are engaged with the positive or negative side of said supply circuit. Therefore, no risk of damage, which might ensue if the return circuits of the receiver were exposed directly to any potential in the house-current circuit, is incurred, and the inconvenience of having to withdraw the plug, turn it around and reinsert it, is also avoided.

A further object is to provide apparatus of the kind described above, in which a receiver is connected to batteries and at the same time the circuit of the apparatus is prepared for connection to a house current supply circuit, merely by turning on the ordinary "on" and "off" switch of a radio receiver. No selective manipulation of the switch is necessary, but as long as it is in the "on" position the batteries will work the set unless and until a plug for connecting the apparatus to a house circuit is inserted into an outlet socket of such a circuit. Then the house current flows into the apparatus, and the battery circuits are broken automatically and without the manual operation of any switch by means energized as soon as the circuit of the house current supply to said apparatus is completed and becomes operative.

An additional object of the invention is to provide an apparatus having suitable means for indicating when the batteries have been rendered inoperative and current from the house supply is effective in the operation of the receiver.

Other objects and advantages will be made clear in the following description taken in connection with the accompanying drawing showing a preferred form in which the invention is embodied; but the accompanying disclosure is for illustration only and many variations may be adopted within the scope of the invention.

In accordance with the present invention, there is provided, in a radio receiver including vacuum tubes in the signal-translating channel thereof, a battery circuit for supplying power to the tubes to operate the receiver, a power-supply circuit connectible to a power line for supplying power to the tubes to operate the receiver, and means for selectively connecting the battery circuit or the power-supply circuit to the tubes. The arrangement also comprises means responsive to the energization of the power-supply circuit from a power line for actuating the above-mentioned connecting means to disconnect the battery circuit from the tubes during the operation of the receiver by power from the power line.

Specifically in carrying out my invention I provide a circuit which may be energized either from batteries or from house current and will have the same bias voltage impressed upon the grids of the tubes irrespective of which source of supply is utilized. I accomplish this result by means of a bridge rectifier and a divided resistance disposed in such a manner that the power supply conductors leading from the battery are connected to the same terminals as the power supply conductors leading from the house current supply through the rectifier and whereby, when house supply is utilized the current flows through only part of the resistor whereas it flows through the entire resistor when battery supply is utilized.

The invention will best be understood if the following description is read in connection with the accompanying drawing which in Figure 1 shows an embodiment of the invention for supplying power to a radio receiver.

Numerals 1 and 2 indicate connection points for a battery of low voltage to supply heating current to the filaments or cathodes of several vacuum tubes attached to terminals 3 and 4; and 5 and 6 are connection points for a battery of higher voltage to supply current to the plates or anodes of the tubes, which are united to the terminal 7. These batteries may be housed within the casing of a radio receiver, which is not illustrated.

At 8 and 9 are the leads for connecting to a house circuit means by which either alternating or direct current may be transmitted to the set. In the conductors 8 and 9 the alternating or direct current flows to a rectifier 10 which is of the bridge type and comprises a pair of vacuum tubes 11a and 11b. Of course the rectifier and all the other electrical members associated therewith for obtaining the desired result may also be housed within the casing of the receiver set. The wires 8 and 9 may carry at their ends remote from the rectifier the usual two-prong plug 12, to be conveniently inserted into a wall outlet and thus connect the apparatus to either alternating or direct house current.

The positive pole of the output of the bridge rectifier is indicated at 13 and the negative at 14. The tubes of the rectifier are so related that the tube 11a has an anode 15 and cathode 16 joined together; the junction being united to the lead 9; it also has a second cathode 17, united to the pole 13. The other tube, 11b, has an anode 15 joined to a cathode 16 and both united to the lead 8, and this tube has another cathode 17 joined to the pole 13. In each tube there is a second anode 18, and these anodes are connected together outside the tubes, and attached to the pole 14. Across the wires 8 and 9 are filament resistances 19 in series with the rectifier filaments 20, which in practice will be inside the tubes, one associated with each pair of anodes and cathodes 15—17, or 16—18.

At 21 is a relay coil connected across the positive and negative output poles 13 and 14, of the rectifier as will be described, the contact points 24a, 24b of the relay being associated with the battery circuits and points 24A, 24B being associated with the rectifier circuit.

From the battery terminal 1 current goes to the terminal 3 through a lead 23 and a movable contact 25 connected to said terminal and normally resting upon the fixed contact 24a attached to the lead 23. Also a conductor 26 leads from the terminal 5 to the terminal 7, and in the line of this conductor is a similar fixed contact 24b and a movable contact 25'. Both movable contacts 25 and 25' are controlled by the relay coil 21, as indicated by the dot-and-dash line connecting said contacts. Of course when the contacts 25 and 25' are in position to close the circuits from the terminals 1 and 5, to the filaments and anodes, the tubes are energized by battery current.

At 27 is a conductor leading from the positive side of the rectifier, with a branch 28A running to a fixed terminal 24A adjacent the contact 24a and a branch 28B leading to a terminal 24B adjacent the terminal 24b. The contacts 24a and 24B, 24b and 24B are so arranged with respect to the movable contacts 25 and 25' that, whenever current passes through the rectifier to the coil 21, these contacts 25 and 25' will be caused to move away from the terminals 24a and 24b and engage the terminals 24A and 24B respectively. The battery circuits will then be opened and current from the rectifier will be transmitted to the cathode and anodes of the tubes in the set. When, however, the rectifier circuits are not energized, the batteries will supply the tube circuits connected to terminals 3, 4 and 7; and suitable springs (not shown) may be mounted and connected to the contacts 25 and 25' to cause them to move into position to close the battery circuits whenever the coil 21 is not receiving current from the rectifier 10.

In the line of the conductor 8 and of the wires 30 and 31 connecting the terminals 4 and 2 are a pair of switch arms 32. These switch arms 32 constitute an ordinary, usually manual, connector switch to open and close the circuit of the cathode battery and the circuit leading from the connector plug 12 through leads 8 and 9 to the rectifier 10. The switch arms can be joined by a link with a button or knob thereon which extends to the outside of the set so that the receiver may be conveniently turned "on" and "off." When the receiver is not in use the switch arms 32 are in "off" position. With the switch arms of the switch 32 in closed position, battery current will be supplied to the tubes whenever the terminals of leads 8 and 9 are not connected to the house current. When terminals of leads 8 and 9 are connected to the house current, however, the relay coil 21 will connect conductors 28A and 28B to the contacts 25 and 25', respectively, so that current from the rectifier will operate the vacuum tubes in the receiver. When the leads 8 and 9 are disconnected from the house circuit the contacts 25 and 25' will be released by the coil 21 and fall back upon contacts 24a and 24b, and the batteries will furnish the electrical energy needed.

To lead 31 is joined a resistance 33, between the switch arm 32 and terminal 2, and this resistance is also connected to the lead 22 between the relay coil 21 and negative pole 14 of the rectifier. A larger resistance 34 is connected to the terminal 6 at one end, and to the lead 22, adjacent the resistance 33 at the other end. The elements 33 and 34 constitute a divided biasing resistor, the end of the resistance 34 toward the terminal 6 being also joined to a large resistance R united to the grids of the receiver shown diagrammatically at G. The resistances 33 and 34 are such that suitable and substantially equal biasing voltage will be applied to the receiver from either the batteries or from the rectifier 10.

In the lead 27 is an inductive reactance 35, at the ends of which a pair of condensers 36 are bridged across to the return wire 22. This provides an electrical filter for uni-directional current which the rectifier produces. The conductor 28A also has a suitable resistance 29 therein between the inductive reactance 35 and contact 24A to insure the proper voltage on the receiver cathodes, and another condenser 37 is joined across the return wire 22 and the wire 28A between the resistance 29 and terminal 24A, for extra filtering effect. Any other suitable filter means may be employed.

When house current is employed, the current returns to the rectifier pole 14 by way of the negative lead 22; and both filament and plate currents pass through the resistor 33 only; and the resistor 34 then serves merely as a slightly additional bias potential resistance in series with the large resistance R, which draws no current. Thus bias potential is impressed upon the grids, as developed at the junction of the two resistances 33 and 34. But when the batteries are used, both resistances 33 and 34 constitute the bias resistance. The negative return is to terminal 6 and negative lead 22 thus becomes dead ended to anodes 18. Thus a larger bias resistance is provided when battery current is used, and the potential developed on the grid by the resistances 33 and 34 together has the same value as the potential produced by the resistance 33 alone when house current is used.

The junction point of the parts 33 and 34, with the batteries in circuit connects with the negative pole 14 of the house current rectifier circuit, which is completely isolated from the conductors 8 and 9, and thus no drain is imposed on the batteries; nor can a short circuit, imposed by accidental connection of ground or other points to the leads 8 and 9, cause any damage.

In order to indicate when the rectifier current is energizing the set and that the batteries are cut out I bridge a small neon light 38 across the poles of the rectifier. After connection is made to house current the set continues to operate from the batteries for a few moments. Illumination of the neon light bulb indicates that the battery circuit is open and the set is operating on house current.

In the operation of a radio receiver with my transmission circuit it will be seen that one only needs to close the "on" and "off" switch 32 in order to immediately energize the receiver and commence reception. When switch 32 is closed, and the leads 8 and 9 are not joined to a house current supply system the set will operate on battery current since the battery circuit is closed when the switch 32 is closed. The battery circuit remains closed at all times until switch 32 is opened except when house current is actually energizing the receiver. When connector plug 12 is inserted into a house supply outlet thus connecting the leads 8 and 9, the receiver will continue operating on battery current until the cathode heaters of the rectifier have been heated by the house supply current when relay coil 21 will become energized and break the battery circuits and close the circuit through the rectifier, whereby the set will continue to operate, without substantial interruption, using energy from the house circuit supply. When connector plug 12 is withdrawn from the house supply circuit outlet, disconnecting leads 8 and 9 from the house supply current, the relay 21 will be released and will immediately break the circuit through the rectifier and close the battery circuits and the set will continue to operate, without substantial interruption, using power supplied from the battery circuits.

The rectifier 10 is energized without transformers and the terminal 13 is always the positive pole thereof. Hence even when the rectifier is connected to a direct current circuit it makes no difference which terminal of the plug 12 is united to the positive side of the line. If the terminal of lead 8 is connected to the positive side of a direct current house supply circuit, current will flow out of the rectifier from the pole 13, and if the terminal of lead 9 should be connected to the positive side of the supply circuit the current will again flow out of the rectifier from the point 13 and hence correct connection to the house wiring is always assured and positive voltages will always be imposed upon the terminals 7 and 3. It will be seen that conductors 8 and 9 are insulated from direct connection with any portion of the radio set or batteries because of this method of rectifier connection. Thus no accidental connection of the receiver chassis or parts thereof to ground can cause damage when house current is used; nor is it necessary to insulate the terminals of plug 12 when the set is used on batteries.

All of the circuits and all of the parts connected to the rectifier may be located in a housing with the receiver, and may be easily carried from place to place while continuing to operate, and, when used indoors or in any place where wiring is present, the batteries may be conserved by merely connecting the set to house current without manually operating any switch, and with the assurance that the polarity of the connector plug and the character of the house current need not be considered.

Instead of a tube rectifier as shown it will be understood that other types of rectifying means may be used.

It will be seen that my invention may be employed with various apparatus, for example an amplifying system, communication systems, etc. When previously known portable sets are connected to house current there is a period of several seconds when no reception is possible, while the rectifier cathode heaters are being heated. In such sets the house current and battery circuits have been separate and independent. An important advantage of my apparatus lies in the fact that since the batteries are operatively connected until the house current heats the rectifier cathode heaters to render the rectifiers operative to operate the relay 21, there need be no interruption in reception, either when shifting from one source of energy to the other, or when originally turning on the set.

Thus it will be seen that by my invention an extremely simple, dependable and convenient apparatus is provided.

In summary, therefore, the arrangement of the drawing provides, in a radio receiver including vacuum tubes in the signal-translating channel thereof, a battery circuit including either of the sets of terminals 1, 2 and 5, 6 and the conductors and batteries associated therewith for supplying power to the tubes of the receiver to operate the receiver. The arrangement also comprises a power-supply circuit, including conductors 8 and 9, which is connectable to a power line for supplying power to the tubes of the receiver to operate the receiver, as well as means, including the relay having winding 21, for selectively connecting the battery circuit or the power-supply circuit to the tubes of the receiver. The arrangement also comprises means responsive to the energization of the power-supply circuit from the power line for energizing the winding 21 thereby to actuate the connecting means, including the relay, to disconnect the battery circuit from the tubes of the receiver during operation of the receiver by power from the power lines. Furthermore, it will be seen that the arrangement comprises means responsive to the energization of the power-supply circuit including conductors 8, 9 from the power-supply line for normally connecting the battery circuits to the tube for operation therefrom upon the operation of the switch 32 to the "on" position and for effectively disconnecting the battery circuits from the tubes and for connecting the tubes of the receiver for operation by power from the power line as soon as such power is available. Specifically, the vacuum tubes of the receiver have a given cathode heating time and the vacuum-tube power-supply means including rectifier 18 has a cathode heating time substantially greater than that of the tubes of the receiver so that, upon placing the radio receiver in operation, power is supplied to operate the receiver from the battery circuit until such time as power is available from the rectifier circuit at which time the relay operates to condition the receiver for operation from the power-supply line.

What I claim is:

1. An electrical power supply circuit for connection with a radio receiving set, comprising, in combination, means for enabling said set to be operated from batteries, means for impressing direct or alternating house supply current on said circuit to energize said set without regard to the polarity of the means for connecting said circuit to the house supply current, and means responsive to the energization of said circuit by said house supply for rendering said first means inoperative while said second means is operative.

2. An electrical power transmission circuit for connection with a radio receiving set, comprising, in combination, means for enabling said set to be operated either from batteries or from direct or alternating house supply current, and means responsive to the energization of said circuit by said house supply for shifting the connections from batteries to house current and from house current to battery upon the insertion or withdrawal of a house connector plug and without the manual operation of any switch, other than an "on" and "off" switch of the radio set.

3. A circuit for supplying electrical energy including, in combination, a plurality of batteries, means for connection to house current, a single switch for simultaneously closing the circuit through the batteries and for closing the circuit through the said means for connection to house current, and means responsive to the energization of said circuit by said house supply for opening the circuit through the batteries when the said means for connection to house current is operatively connected to house current and to close said circuit when said means for connection to house current is disconnected from house current.

4. An electrical circuit for connection with a radio receiving set, comprising, in combination, means for enabling said set to be operated from batteries, means for impressing direct or alternating current from an additional source on said circuit to energize said set, means responsive to the energization of said circuit by said additional source for opening the connections between said batteries and the set and for closing the connections to the set of the additional source upon the insertion of a connector plug to said additional source, without regard to the polarity of said plug, and without the operation of any other switch than the "on" and "off" switch of the radio set.

5. A circuit for supplying electrical energy to a radio receiver including tubes having grids, comprising, in combination, a plurality of batteries, means for connection to house current, output terminals, connections between said output terminals and said batteries for enabling said set to be operated from said batteries, means for providing suitable potential for the grids of said tubes, connections between said output terminals and said means for connection to house current including a bridge rectifier, means responsive to the energization of said set by said house current for disconnecting said batteries while said bridge rectifier is operative, and a portion of said means for providing grid potential being utilized in the connection between said output terminals and said batteries.

6. In a universal radio set having tubes connected for operation by power supplied from a battery, a battery associated with said set for operating said set, and means for connecting said battery to said set, the combination with, power supply means connectible to a power line for operating said set by power from a power line, a connector for connecting said power supply means to said power line, and means responsive to power from said power line for disconnecting said battery from said set to insure that said battery is disconnected from said set during operation of said set by power from said power line, whereby said set may be operated by said battery when power from a power line is unavailable and said battery may be conserved when power from a power line is available.

7. In a radio receiver including vacuum tubes in the signal-translating channel thereof, a battery circuit for supplying power to said tubes to operate said receiver, a power-supply circuit connectible to a power line for supplying power to said tubes to operate said receiver, means for selectively connecting said battery circuit or said power-supply circuit to said tubes, and means responsive to the energization of said power-supply circuit from a power line for actuating said connecting means to disconnect said battery circuit from said tubes during operation of said receiver by power from said power line.

8. In a radio receiver including vacuum tubes in the signal-translating channel thereof, a battery circuit for supplying power to said tubes to operate said receiver, an on-off switch for said receiver, a power-supply circuit connectible to a power line for supplying power to said tubes to operate said receiver, means for selectively connecting said battery circuit or said power-supply circuit to said tubes, and means responsive to the energization of said power-supply circuit from said power-supply line for normally connecting said battery circuit to said tubes for operation therefrom upon the operation of said switch to said "on" position and for effectively disconnecting said battery circuit from said tubes and connecting said receiver for operation by power from said power line as soon as such power is available.

9. In a radio receiver including vacuum tubes in the signal-translating channel thereof, a battery circuit for supplying power to said tubes to operate said receiver, a power-supply circuit connectible to a power-supply line with either polarity for supplying power to said tubes to operate said receiver, means responsive to the energization of said power-supply circuit from said power-supply line for connecting said power-supply circuit to said power-supply line and for effectively disconnecting said battery circuit from said tubes during operation of said receiver by power from said power line.

10. In a radio receiver including vacuum tubes in the signal-translating channel thereof, a battery circuit for supplying power to said tubes for operation of said receiver, a power-supply circuit connectible to a power-supply line for supplying power to said tubes to operate said receiver, means for selectively connecting said battery circuit or said power-supply circuit to said tubes, and means responsive to the energization of said power-supply circuit from said power-supply line for effectively disconnecting said battery circuit from said tubes and connecting said power-supply circuit to said tubes as soon as power is available for operation of said receiver from said power line.

11. In a radio receiver including in the signal-translating channel thereof vacuum tubes having given cathode heating times, a battery circuit for supplying power to said tubes to operate said receiver, a vacuum-tube power-supply means having a cathode heating time substantially greater than that of said tubes and connectible to a power-supply line for supplying power to said tubes to operate said receiver, means for selectively connecting said battery circuit or said power-supply means to said tubes, and means responsive to the energization of said power-supply means from said power-supply line for actuating said connecting means to disconnect said battery circuit from said tubes and to connect said power-supply means to said tubes as soon as power is available for operation of said receiver from said power-supply line.

TOWNSEND S. JONES.